United States Patent
Nishida et al.

(10) Patent No.: US 8,323,834 B2
(45) Date of Patent: Dec. 4, 2012

(54) ELECTRIC STORAGE ELEMENT

(75) Inventors: Tetsuo Nishida, Izumiotsu (JP); Sojiro Kon, Izumiotsu (JP); Tetsuya Kume, Kakegawa (JP); Yoshinobu Sakakibara, Kakegawa (JP)

(73) Assignee: Stella Chemifa Corporation, Osaka (JP)

( * ) Notice: Subject to any disclaimer, the term of this patent is extended or adjusted under 35 U.S.C. 154(b) by 588 days.

(21) Appl. No.: 12/523,707

(22) PCT Filed: Jan. 18, 2008

(86) PCT No.: PCT/JP2008/050633
§ 371 (c)(1),
(2), (4) Date: Jul. 17, 2009

(87) PCT Pub. No.: WO2008/088050
PCT Pub. Date: Jul. 24, 2008

(65) Prior Publication Data
US 2010/0099030 A1    Apr. 22, 2010

(30) Foreign Application Priority Data
Jan. 19, 2007  (JP) .................................. 2007-010529

(51) Int. Cl.
*H01M 4/58* (2010.01)
(52) U.S. Cl. .................. 429/231.8; 429/231.5; 429/129; 429/246; 361/502
(58) Field of Classification Search ............... 429/231.8, 429/231.5, 129, 246; 361/502
See application file for complete search history.

(56) References Cited

U.S. PATENT DOCUMENTS

| | | |
|---|---|---|
| 5,953,204 A | 9/1999 | Suhara et al. |
| 6,310,762 B1 | 10/2001 | Okamura et al. |
| 6,824,923 B2 | 11/2004 | Che et al. |
| 2002/0012223 A1 | 1/2002 | Okamura et al. |
| 2004/0131860 A1 | 7/2004 | Tano et al. |

FOREIGN PATENT DOCUMENTS

| | | |
|---|---|---|
| EP | 0 552 731 A1 | 7/1993 |
| JP | 11-317333 A | 11/1999 |
| JP | 2003-132945 A | 5/2003 |
| JP | P3689948 B2 | 6/2005 |
| JP | 2005-353652 A | 12/2005 |

OTHER PUBLICATIONS

European Search Report; Application No. EP08703483; Jan. 6, 2011.
Chinese Office Action; Application No. 94117558; Nov. 3, 1994.

*Primary Examiner* — Laura Weiner
(74) *Attorney, Agent, or Firm* — Knobbe Martens Olson & Bear LLP

(57) ABSTRACT

Disclosed is an electrical storage device having excellent safety and high battery capacity. Specifically disclosed is an electrical storage device comprising at least a positive electrode having a positive electrode active material layer and a positive electrode collector, a negative electrode having a negative electrode active material layer and a negative electrode collector, a separator and an organic electrolyte solution. This electrical storage device is characterized in that the negative electrode active material layer is composed of a metal complex oxide which absorbs and desorbs lithium ions, the positive electrode active material layer contains a carbonaceous material having a layered crystal structure, and the interlayer distance $d_{002}$ of the layered crystal structure in the carbonaceous material is within the range of 0.36-0.38 nm.

8 Claims, 1 Drawing Sheet

ELECTRIC STORAGE ELEMENT

This application is the U.S. National Phase under 35. U.S.C. §371 of International Application PCT/JP2008/050633, filed Jan. 18, 2008, which claims priority to Japanese Patent Application No. 2007-010529, filed Jan. 19, 2007. The International Application was published under PCT Article 21(2) in a language other than English.

TECHNICAL FIELD

The present invention relates to a battery device provided with a positive electrode having at least a positive electrode active material layer and a positive electrode collector, a negative electrode, a separator, and an organic electrolytic solution.

BACKGROUND ART

In recent years, improved output densities and energy densities have been required of electrochemical devices including electric double layer capacitors and lithium ion batteries.

Patent Document 1 below discloses an electric storage element wherein activated carbon is used in a positive electrode and a carbon material storing and releasing lithium ions is used in a negative electrode. This electric storage element is capable of higher voltage than conventional electric double layer capacitors and can thus increase energy density. In addition, this electric storage element is characterized by being capable of higher output than conventional lithium ion batteries and being excellent in cycle characteristic.

However, this electric storage element uses conventional activated carbon in the positive electrode, and thus the energy density thereof as an electrochemical device is limited by the performance of the positive electrode and is insufficient. The carbon material storing and releasing lithium ions is used in the negative electrode, and the potential of the negative electrode changes in the vicinity of potential at which lithium is precipitated. Accordingly, internal short-circuit is caused by precipitation of lithium dendrites, so that the risk of leading to accidents such as ignition and explosion cannot be eliminated.

Patent Document 2 below discloses an electric storage element wherein activated carbon is used in a positive electrode, lithium titanate is used in a negative electrode, and an organic solvent, a lithium salt and an ionic liquid are used in an organic electrolyte. The working potential of lithium titanium is about 1.5 V relative to the equilibrium potential of lithium (that is, vs. Li/Li$^+$) and can thus attain higher safety than by carbon materials working near the potential at which lithium is precipitated. However, conventional activated carbon is used in the positive electrode, so the working potential of this electric storage element is about 2.5 V and is also low in capacity, thus making it impossible to expect advantage over conventional activated carbon capacitors.

Patent Document 1: Japanese Patent No. 3689948
Patent Document 2: JP-A 2005-353652

DISCLOSURE OF THE INVENTION

Problems to be Solved by the Invention

The present invention was made in view of the problems described above, and the object of the present invention is to provide an electric storage element which is excellent in safety and has a high battery capacity.

Means for Solving the Problems

To solve the conventional problems, the present inventors examined an electric storage element. As a result, they found that the object described above can be achieved by adopting the following constitution, and the present invention was thereby completed.

In order to solve the above problems, the invention is directed to an electric storage element comprising: at least a positive electrode having a positive electrode active material layer and a positive electrode current collector, a negative electrode having a negative electrode active material layer and a negative electrode current collector, a separator, and an organic electrolyte, wherein the negative electrode active material layer comprises of a metal composite oxide storing and releasing lithium, ions, and the positive electrode active material layer contains a carbonaceous material having a layered crystal structure, and the interlayer distance $d_{002}$ of the layered crystal structure in the carbonaceous material is 0.36 nm to 0.38 nm.

In the battery device, the negative electrode preferably has a working potential of 1 V (vs. Li/Li$^+$) or more.

In the battery device, the negative electrode active material layer preferably comprises lithium titanate.

In the battery device, the organic electrolyte preferably comprises a quaternary ammonium salt or a quaternary phosphonium salt and a lithium salt dissolved in an organic solvent.

In the battery device, the quaternary ammonium salt preferably is an ionic liquid.

In the battery device, the organic electrolyte preferably comprises a lithium salt dissolved in an ionic liquid.

In the battery device, the lithium salt preferably is at least one of LiBF$_4$ and LiPF$_6$.

Effect of the Invention

By the means described above, the present invention exhibits the following effects.

That is, as compared with conventional electric storage elements using, as the positive electrode active material, amorphous activated carbon having no crystal structure, the electric storage element of the present invention using, as the positive electrode active material, a carbonaceous material having a layered crystal structure with an interlayer distance $d_{002}$ of 0.36 nm to 0.38 nm can have a larger battery capacity than in the conventional electric storage elements, thus improving performance. As the negative electrode active material, a metal composite oxide storing and releasing lithium ions are used, so precipitation of lithium dendrites can be reduced. As a result, the short circuit between the positive electrode and the negative electrode, which is caused by lithium dendrites breaking through a separator, can be prevented thereby improving safety.

EXPLANATION OF THE REFERENCE NUMERALS

| | |
|---|---|
| 9 | bolt |
| 10 | caulking washer |
| 11 | container body |
| 12 | spacer |
| 13 | O-ring |
| 14 | lid part |
| 15 | bushing |
| 16 | nut |
| 17 | positive electrode |
| 18 | separator |
| 19 | negative electrode |
| 20 | round plate |
| 21 | spring |

BEST MODE FOR CARRYING OUT THE INVENTION

An embodiment of the present invention will be described below.

Figure 1:
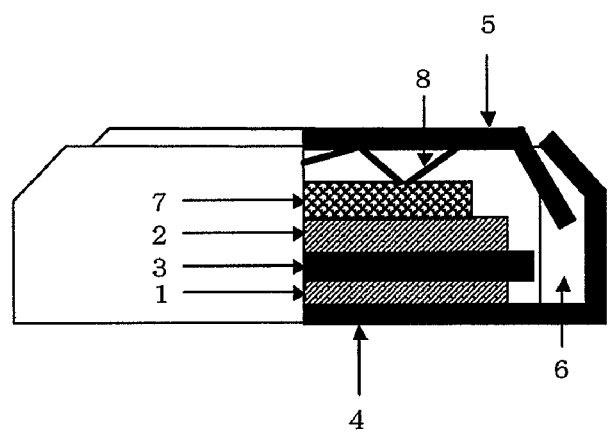
FIG. 1 is a schematic cross-sectional view of a battery device according to an embodiment of the present invention.

As shown in FIG. 1, a battery device according to this embodiment has a structure where a laminated body prepared by laminating a positive electrode 1, a separator 3, a negative electrode 2 and a spacer 7 in this order from the side of a positive electrode can 4 is stored in an inner space formed by the positive electrode can 4 and a negative electrode can 5. The positive electrode 1 and the negative electrode 2 are moderately pressure-bonded and fixed by interposing a spring 8 between the negative electrode can 5 and the spacer 7. An organic electrolytic solution is impregnated between the positive electrode 1, the separator 3 and the negative electrode 2. The positive electrode can 4 and the negative electrode can 5 are combined by holding each other in a state where a gasket 6 is interposed between the positive electrode can 4 and the negative electrode can 5 to hermetically close the laminated body.

The positive electrode 1 has a positive electrode active material layer and a positive electrode current collector. The positive electrode active material layer is constituted by containing, as an essential component, a carbonaceous material having a layered crystal structure. The carbonaceous material having a layered crystal structure has a structure wherein a plurality of planes each formed from carbon atoms arranged in a hexagonal network structure have been tiered. Depending on the degree of development of this layered structure and on the shape and interlayer distance of the layered structure, there are various types of carbonaceous material, and whether the material has a layered structure or not can be confirmed by powder X-ray diffractometry. This carbonaceous material having a layered structure includes, and is divided roughly into, graphite-based material and non-graphite-based material, and this carbonaceous material does not include diamond and amorphous carbon showing no crystal structure, for example activated carbon.

The graphite material includes, for example, natural graphite, artificial graphite, boronated graphite, mesocarbon microbeads, pitch-based carbon fiber graphitized material, and carbon nanotubes, but the present invention is not limited.

Examples of the non-graphite-based materials include easily graphitized carbon, hardly graphitized carbon, low-temperature burned carbon and the like. Examples of the easily graphitized carbons include carbon prepared by burning cork or petroleum pitch at a temperature of 2000° C. or less, and the like. Examples of the hardly graphitized carbons include a polyacrylonitrile-based carbon fiber burned at about 1000° C., furfuryl alcohol resin burned carbon, phenol-based resin burned carbon and the like. Examples of the low-temperature burned carbons include carbon prepared by burning the easily graphitized carbon and the hardly graphitized carbon at a low temperature below 1000° C.

The carbonaceous material to be contained in the positive electrode active material is characterized by having a layered crystal structure. The carbonaceous material is not particularly limited, but when the distance (interlayer distance) between carbon crystals constituting the carbonaceous material is short, the capacity of the electric storage element may be decreased due to increased resistance to storage of solvated ions into the carbonaceous material. Accordingly, the interlayer distance is preferably 0.36 nm or more, more preferably 0.365 nm or more. When the interlayer distance is large, the capacity per unit volume is decreased, and various electrolyte ions, solvent, N gas etc. may be incorporated into the carbonaceous material to cause significant expansion in volume. Accordingly, the upper limit of the interlayer distance is preferably 0.38 nm, more preferably 0.375 nm. The interlayer distance can be measured by a powder X-ray diffraction XRD method.

To suppress the incorporation of various electrolyte ions, solvent etc. into the carbonaceous material, it is also preferable to decrease the specific surface area of the carbonaceous material. Accordingly, the specific surface area of the carbonaceous material is preferably not higher than $1000 \, m^2/g$, more preferably not higher than $700 \, m^2/g$, still more preferably not higher than $500 \, m^2/g$. The lower limit of the specific surface area is not particularly limited as long as the performance of the electric storage element is not influenced, but when the specific surface area is too small, the output performance of the electric storage element is adversely affected. Therefore, the lower limit of the specific surface area is preferably $10 \, m^2/g$, more preferably $50 \, m^2/g$, still more preferably $100 \, m^2/g$. The specific surface area can be measured by the BET method using $N_2$ as an adsorbent.

The positive electrode active material used in the electric storage material of the present invention is more preferably nonporous carbon having the characteristics described above (that is, the interlayer distance $d_{002}$ between carbon crystals is 0.36 nm to 0.38 nm, and the specific surface area is $10 \, m^2/g$ to $1000 \, m^2/g$). This carbonaceous material having a layered crystal structure is particularly advantageous in that it can attain higher capacitance than by conventional activated carbon that does not show a $d_{002}$ diffraction peak by powder X-ray diffractometry.

A method of producing the carbonaceous material is not particularly limited. The carbonaceous material can be prepared by methods described in, for example, DENKI KAGAKU, 66, 1311 (1998), Electrochemistry, 69, 487 (2001), and JP-A 2003-51430. In these production methods, graphite-based materials and non-graphite-based materials described later can be used as the starting material to preferably produce the carbonaceous material having the above specific surface area and the carbonaceous material containing carbon layered crystals having the above interlayer distance. Specifically, the carbonaceous material can be obtained by dry distillation easily graphitizable carbon such as petroleum-based cokes at about 700 to 800° C. to remove volatile components and further subjecting it to activation treatment. In the activation step, caustic alkali such as KOH used in a process for producing usual activated carbon is added to the material which is then heat-treated under temperature conditions at about 800 to 900° C. By the method described above, carbon having an interlayer distance $d_{002}$ of 0.36 nm to 0.38 nm can be obtained. Thereafter, hydrogen treatment is carried out if necessary, whereby a clean nonporous carbonaceous material from which surface functional groups were removed can be obtained.

The carbon obtained by the method described above is "nonporous carbon" having carbon layered crystals with an interlayer distance $d_{002}$ of 0.36 to 0.38 nm, which as compared with conventional activated carbon, has very scarce pores through which various electrolyte ions, solvent, $N_2$ gas etc. can be incorporated. The specific surface area and the interlayer distance can be determined by the BET method using $N_2$ as an adsorbent and a powder X-ray diffraction XRD method, respectively.

When nonporous carbon having carbon microcrystals with the specific surface area in the above numerical range and/or the interlayer distance in the above numerical range is contained in the positive electrode active material, not only the nonporous carbon but also other materials, for example known activated carbon, graphite materials such as natural graphite, artificial graphite, boronated graphite, mesocarbon microbeads and pitch-based carbon fiber graphitized material, and non-graphite materials such as easily graphitizable carbon, hardly graphitizable carbon and low-temperature fired carbon can be contained in such a degree that the performance of the electric storage element is not adversely affected.

The known activated carbon refers, for example, to activated carbon that does not have crystallinity without showing a $d_{002}$ diffraction peak even by powder X-ray diffractometry. Usually, activated carbon is obtained by carbonizing a raw carbonaceous material at a temperature of 900° C. or less and then activating it. The raw carbonaceous material includes, but is not limited to, wood, palm shell, saw dust, coal, pitch, cokes, phenol resin, furan resin, polyvinyl chloride resin, polyvinylidene chloride resin, polyimide resin, polyamide resin, polycarbodiimide resin, waste plastics, waste tire etc. The activation method includes a gas activation method of reacting a carbonized raw material at a high temperature of 600 to 1000° C. in a gas atmosphere such as water vapor, carbon dioxide gas, or oxygen, and a chemical activation method of mixing a carbonated raw material with a chemical such as zinc chloride, potassium hydroxide, or sodium hydroxide and thermally treating it in an inert atmosphere, and any of the methods can be used. By the activation method, a large number of pores are formed in the carbon material, to increase the specific surface area. The specific surface area of the activated carbon obtained in this manner is 1000 to 2000 $m^2/g$ or 3000 $m^2/g$ at a maximum. The activated carbon prepared in this manner has not developed crystallinity and does not show a $d_{002}$ peak even by powder X-ray diffractometry.

When the activated carbon described above is mixed and used as the positive electrode active material, the upper limit of the activated carbon mixed is preferably 80% by weight or less, more preferably 60% by weight or less, based on the weight of the positive electrode active material. The upper limit is still more preferably 50% by weight or less, further more preferably 30% by weight or less. It is not preferable that the amount of the activated carbon is higher than 70% by weight, because the capacity of the positive electrode is reduced.

The positive electrode current collector may be an electrochemically and chemically corrosive-resistant conductive material. Specifically, a plate or foil of stainless steel, aluminum, titanium or tantalum can be used. A plate or foil of stainless steel or aluminum among these materials is a current collector that is preferable for aspects of both performance and cost.

The negative electrode 2 is constituted by having a negative electrode active material layer and a negative electrode current collector. In the negative electrode active material layer, a transition metal composite oxide is used as a main component.

The working potential of the negative electrode 2 is 1 V (vs. $Li/Li^+$) or more, preferably 1.2 V (vs. $Li/Li^+$) or more, more preferably 1.5 V (vs. $Li/Li^+$) or more. The working potential of the negative electrode 2 is 2 V (vs. $Li/Li^+$) or less in consideration of effective achievement of safety and capacity.

Examples of the metal composite oxide storing and releasing lithium ions include, but are not limited to, a lithium-titanic acid compound, a lithium-niobic acid compound, a lithium-vanadic acid compound, a lithium-ferrite compound, a lithium-boric acid compound, and a lithium-phosphoric acid compound. A part of the major component elements constituting these metal composite oxides may be substituted by different kinds of elements such as V, Cr, Al, Mn, B, Fe, Co, Ni, Mo, and W. Among them, lithium titanate (lithium-titanic acid compound) is preferably used from the viewpoint of prevention from capacity deterioration and long-term reliability.

The charging/discharging potential of lithium titanate by storage and desorption of lithium ion is in the vicinity of about 1.5 V relative to the $Li^+/Li$ potential, and therefore, the electric storage element is at low risk for lithium dendrite generation or short circuit, thus making it excellent in safety. Further, lithium titanate has a spinel-type crystal structure with little dimensional change accompanying the storage and desorption of lithium. Accordingly, the electric storage element has high long-term reliability with less capacity deterioration by expansion in the volume of the electrode.

Although the lithium titanate is not particularly limited, its specific surface area is preferably 3 to 10 $m^2/g$. When the specific surface area is not smaller than 3 $m^2/g$, the working area of the electrode can be larger to increase the capacity. When the specific surface area is not greater than 10 $m^2/g$, the bulk density and tap density can be prevented from decreasing, and the capacity per unit volume can be prevented from decreasing. The tap density is preferably not lower than 1.0 $g/cm^3$.

The lithium titanate is obtained by drying granulation of slurry containing a titanium compound and a lithium compound and subsequent heating firing thereof, as described in JP-A 2005-239461. That is, metatitanic acid represented by $TiO(OH)_2$ or $TiO_2.H_2O$, orthotitanic acid represented by $Ti(OH)_4$ or $TiO_2.2H_2O$, titanium oxides having an anatase-type, rutile-type or brookite-type crystal structure or a mixture thereof is used as a titanic acid compound to form slurry with lithium hydroxide. The slurry prepared in the range of 50 to 100° C. with water or an organic solvent such as alcohol as a medium for the slurry is subjected to heating firing. The product is then fired at a firing temperature of 650 to 850° C., thereby producing lithium titanate having a tap density of 1.0 to 2.5 $g/cm^3$.

The negative electrode current collector includes, for example, a copper foil, a nickel foil, a stainless steel foil, etc.

As the organic electrolyte in the present invention, an electrolyte having a lithium salt dissolved in an organic solvent can be used. Alternatively, a solution comprising a lithium salt dissolved in an ionic liquid can also be used. Further, a solution comprising a quaternary ammonium salt and a lithium salt dissolved in an organic solvent can also be used.

Examples of the lithium salt include, but are not limited to, $LiBF_4$, $LiPF_6$, $LiClO_4$, $LiBF_3CF_3$, $LiBF_3C_2F_5$, $LiCF_3SO_3$, $LiC_2F_5SO_3$, $LiC_3F_7SO_3$, $LiC_4F_9SO_3$, $LiN(SO_2F)_2$, $LiN(CF_3SO_2)_2$, $LiN(C_2F_5SO_2)_2$, $LiN(CF_3SO_2)(CF_3CO)$, $LiN(CF_3SO_2)(C_2F_5SO_2)$, and $LiC(CF_3SO_2)_3$. Preferable examples include $LiBF_4$, $LiPF_6$, $LiN(CF_3SO_2)_2$, and $LiN(SO_2F)_2$. More preferable examples include $LiBF_4$, $LiPF_6$, and $LiN(CF_3SO_2)_2$. Even more preferable examples include $LiBF_4$ and $LiPF_6$. These lithium salts can be used alone or as a mixture of two or more thereof.

Examples of the organic solvents used in the present invention include cyclic carbonic acid esters, chain carbonic acid esters, phosphoric acid esters, cyclic ethers, chain ethers, lactone compounds, chain esters, nitrile compounds, amide compounds, sulfone compounds, and the like. Although not limitative, the compounds given below are more specific examples.

Examples of the cyclic carbonic acid esters include ethylene carbonate, propylene carbonate, butylene carbonate, and the like. Preferable are ethylene carbonate and propylene carbonate. Examples of the chain carbonic acid esters include dimethyl carbonate, ethylmethyl carbonate, diethyl carbonate, and the like. Preferable are dimethyl carbonate and ethylmethyl carbonate. Examples of the phosphoric acid esters include trimethyl phosphate, triethyl phosphate, ethyldimethyl phosphate, diethylmethyl phosphate, and the like. Examples of the cyclic ethers include tetrahydrofuran, 2-methyltetrahydrofuran, and the like. Examples of the chain ethers include dimethoxyethane, and the like. Examples of the lactone compounds include γ-butyrolactone, and the like. Examples of the chain esters include methyl propionate, methyl acetate, ethyl acetate, methyl formate, and the like. Examples of the nitrile compounds include acetonitrile, and the like. Examples of the amide compounds include dimethylformamide, and the like. Examples of the sulfone compounds include sulfolane, methyl sulfolane, and the like. These organic solvents may be used singly, or two or more kinds thereof can be used in combination. The organic solvent wherein at least a part of hydrogen atoms of a hydrocarbon group contained in the molecule thereof are substituted by fluorine atoms can also be preferably used.

The organic electrolytic solution of the present invention can be produced by, for example, dissolving lithium hexafluorophosphate in a concentration of 1 mol/L in a solvent of a mixture prepared by mixing ethylene carbonate and ethylmethyl carbonate by a volume ratio of 1:3. Another examples include a solution prepared by dissolving lithium tetrafluoroborate in a concentration of 1 mol/L in a solvent of a mixture prepared by mixing ethylene carbonate and ethylmethyl carbonate by a volume ratio of 1:3.

The concentration of an electrolyte to be dissolved is usually 0.1 to 2.0 mol/L, preferably 0.15 to 1.5 mol/L, more preferably 0.2 to 1.2 mol/L and particularly preferably 0.3 to 1.0 mol/L. If the concentration of the electrolyte is less than 0.1 mol/L, when the current is large, depletion of ion occurs in the vicinity of the electrode to result in voltage depression. If the ion concentration of the electrolyte is over 2.0 mol/L, the electrolytic solution has unpreferably a high viscosity to entail lower electrical conductivity.

To use the electric storage element of the present invention, an organic electrolyte comprising a quaternary ammonium salt or a quaternary phosphonium salt and a lithium salt dissolved in an organic solvent can be preferably used. The quaternary ammonium salt or quaternary phosphonium salt to be mixed for use may be an ionic liquid which is liquid at ordinary temperatures. As compared with an electrolyte comprising a lithium salt only dissolved in an organic solvent, the organic electrolyte comprising a quaternary ammonium salt or a quaternary phosphonium salt and a lithium salt dissolved in an organic solvent has improved electric conducting property and is effective in reducing the internal resistance of the electric storage element.

The quaternary ammonium salt or quaternary phosphonium salt used in the present invention is formed from combination of various cations and anions. The quaternary ammonium cation used in the present invention includes, but is not limited to, a tetraalkylammonium cation, an imidazolium cation, a pyrazolium cation, a pyridinium cation, a triazolium cation, a pyridazinium cation, a triazolium cation, an oxazolium cation, a pyrimidinium cation, and a pyrazinium cation.

The tetraalkylammonium cation includes, but is not limited to, a tetraethylammonium cation, a tetramethylammonium cation, a tetrapropylammonium cation, a tetrabutylammonium cation, a triethylmethylammoniumcation, a trimethylethylammoniumcation, a dimethyldiethylammonium cation, a trimethylpropylammonium cation, a trimethylbutylammonium cation, a dimethylethylpropylammonium cation, a methylethylpropylbutylammonium cation, an N,N-dimethylpyrrolidinium cation, an N-ethyl-N-methylpyrrolidinium cation, an N-methyl-N-propylpyrrolidinium cation, an N-ethyl-N-propylpyrrolidinium cation, an N,N-dimethylpiperidinium cation, an N-methyl-N-ethylpiperidinium cation, an N-methyl-N-propylpiperidinium cation, an N-ethyl-N-propylpiperidinium cation, an N,N-dimethylmorpholium cation, an N-methyl-N-ethylmorpholium cation, an N-methyl-N-propylmorpholium cation, an N-ethyl-N-propylmorpholium cation, a tirmethylmethoxymethylammonium cation, a dimethylethylmethoxymethylammonium cation, a dimethylpropylmethoxymethylammonium cation, a dimethylbutylmethoxymethylammonium cation, a diethylmethylmethoxymethylammonium cation, a methylethylpropylmethoxymethylammonium cation, a triethylmethoxymethylammonium cation, a diethylpropylmethoxymethylammonium cation, a diethylbutylmethoxymethylammonium cation, a dipropylmethylmethoxymethylammonium cation, a dipropylethylmethoxymethylammonium cation, a tripropylmethoxymethylammonium cation, a tributylmethoxymethylammonium cation, a trimethylethoxymethylammonium cation, a dimethylethylethoxymethylammonium cation, a dimethylpropylethoxymethylammonium cation, a dimethylbutylethoxymethylammonium cation, a diethylmethylethoxymethylammonium cation, a triethylethoxymethylammonium cation, a diethylpropylethoxymethylammonium cation, a diethylbutylethoxymethylammonium cation, a dipropylmethylethoxymethylammonium cation, a dipropylethylethoxymethylammonium cation, a tripropylethoxymethylammonium cation, a tributylethoxymethylammonium cation, an N-methyl-N-methoxymethylpyrrolidinium cation, an N-ethyl-N-methoxymethylpyrrolidinium cation, an N-propyl-N-methoxymethylpyrrolidinium cation, an N-butyl-N-methoxymethylpyrrolidinium cation, an N-methyl-N-ethoxymethylpyrrolidinium cation, an N-methyl-N-propoxymethylpyrrolidinium cation, an N-methyl-N-butoxymethylpyrrolidinium cation, an N-methyl-N-methoxymethylpyrrolidinium cation, an N-ethyl-N-methoxymethylpyrrolidinium cation, an N-methyl-N-ethoxymethylpyrrolidinium cation, an N-propyl-N-methoxymethylpyrrolidinium cation, and an N-methyl-N-propoxymethylpyrrolidinium cation.

The imidazolium cation includes, but is not limited to, a 1,3-dimethylimidazolium cation, a 1-ethyl-3-methylimidazolium cation, a 1,3-diethylimidazolium cation, a 3-ethyl-1,2-dimethylimidazolium cation, a 1,2-dimethyl-3-propylimidazolium cation, a 4-ethyl-1,2,3-trimethylimidazolium cation, a 2,4-diethyl-1,3,4-trimethylimidazolium cation, a 2-ethyl-1,3,4-trimethylimidazolium cation, a 2,3-diethyl-1,4-dimethylimidazolium cation, a 2,3,4-triethyl-1-methylimidazolium cation, a 1,2-diethyl-3,4-dimethylimidazolium cation, and a 1,2,4-triethyl-3-methylimidazolium cation.

The pyrazolium cation includes, but is not limited to, a 1,2-dimethylpyrazolium cation, a 1-methyl-2-ethylpyrazolium cation, a 1-propyl-2-methylpyrazolium cation, and a 1-methyl-2-butylpyrazolium cation. The pyridinium cation includes, but is not limited to, an N-methylpyridinium cation, an N-ethylpyridinium cation, an N-propylpyridinium cation, and an N-butylpyridinium cation. The triazolium cation includes, but is not limited to, a 1-methyltriazolium cation, a 1-ethyltriazolium cation, a 1-propyltriazolium cation, and a 1-butyltriazolium cation. The pyridazinium cation includes, but is not limited to, a 1-methylpyridazinium cation, a 1-ethylpyridazinium cation, a 1-propylpyridazinium cation, and a 1-butylpyridazinium cation. The thiazolium cation includes, but is not limited to, a 1,2-dimethylthiazolium cation and a 1,2-dimethyl-3-propylthiazolium cation. The oxazolium cation includes, but is not limited to, a 1-ethyl-2-methyloxazolium cation and 1,3-dimethyloxazolium cation. The pyrimidinium cation includes, but is not limited to, a 1,2-dimethylpyrimidinium cation and a 1-methyl-3-propylpyrimidinium cation. The pyrazinium cation includes, but is not limited to, a 1-ethyl-2-methylpyrazinium cation and a 1-butylpyrazinium cation. These cations may be used alone or in combination of two or more thereof.

The quaternary phosphonium cation used in the present invention includes a tetraalkylphosphonium cation. The tetraalkylphosphonium cation includes, but is not limited to, a tetraethylphosphonium cation, a tetramethylphosphonium cation, a tetrapropylphosphonium cation, a tetrabutylphosphonium cation, a triethylmethylphosphonium cation, a trimethylethylphosphonium cation, a dimethyldiethylphosphonium cation, a trimethylpropylphosphonium cation, a trimethylbutylphosphonium cation, a dimethylethylpropylphosphonium cation, and a methylethylpropylbutylphosphonium cation.

Specific examples of fluorine-containing anions constituting the quaternary ammonium salt and quaternary phosphonium salt used in the present invention include, for example, $BF_4^-$, $PF_6^-$, $BF_3C_3^-$, $BF_3C_2F_5^-$, $CF_3SO_3^-$, $C_2F_5SO_3^-$, $C_3F_7SO_3^-$, $C_4F_9SO_3^-$, $N(SO_2F)_2^-$, $N(CF_3SO_2)_2^-$, $N(C_2F_5SO_2)_2^-$, $N(CF_3SO_2)(CF_3CO)^-$, and $N(CF_3SO_2)(C_2F_5SO_2)_2^-$. Preferable examples include $BF_4^-$, $PF_6^-$, $N(CF_3SO_2)_2^-$, and $N(SO_2F)_2^-$. More preferable examples include $BF_4^-$, $PF_6^-$, and $N(CF_3SO_2)_2^-$. Even more preferable examples include $BF_4^-$ and $PF_6^-$.

When the solution comprising a quaternary ammonium salt or a quaternary phosphonium salt dissolved in an organic solvent is used as an electrolyte in the electric storage element of the present invention, the concentration of a lithium salt to be dissolved is usually 0.1 to 2 mol/L, preferably 0.15 to 1.5 mol/L, more preferably 0.2 to 1.2 mol/L, even more preferably 0.3 to 1 mol/L. When the lithium salt concentration is lower than 0.1 mol/L, ion depletion is generated in the vicinity of the electrode if the current value is high, thus leading to voltage drop. It is not preferable either that the lithium salt concentration is higher than 2 mol/L, because the viscosity of the electrolyte is increased to deteriorate electric conducting property. The concentration of the quaternary ammonium salt or the quaternary phosphonium salt used as a mixture with the lithium salt is preferably established such that the molar ratio of the quaternary ammonium salt or the quaternary phosphonium salt to the lithium salt ranges from 0.29 to 3.5. When the molar ratio is lower than 0.29, discharging/charging capacity is caused to decrease, while when the molar ratio is higher than 3.5, the viscosity of the electrolyte is increased, the electric conducting property is decreased and the mobility of lithium ion is decreased, which may result in a decrease in the discharging/charging capacity.

An ionic liquid which is liquid at ordinary temperatures is present in the quaternary ammonium salt or quaternary phosphonium salt. The ionic liquid is liquid at ordinary temperatures and is electrochemically highly stable. Further, the ionic liquid itself is composed of anions and cations only, and thus has high ion density to show excellent ion conductivity. The organic electrolyte comprising a lithium salt dissolved in an ionic liquid, which is used in the electric storage element of the present invention, does not contain an organic solvent and is thus preferable when the electric storage element of the present invention is used under a high-temperature atmosphere.

When an electrolyte having a lithium salt dissolved in an ionic liquid is used as the electrolyte in the electric storage element, the concentration of the lithium salt to be dissolved in the ionic liquid is preferably 0.1 to 1.5 mol/L, more preferably 0.15 to 1.0 mol/L. When the lithium salt concentration is lower than 0.1 mol/L, ion depletion is generated in the vicinity of the electrode if the current value is high, thus leading to voltage drop. When the lithium salt concentration is higher than 1.5 mol/L, the electric conducting property is deteriorated to decrease the performance of the electric storage element.

Specific organic additives may be mixed and used in the organic electrolyte used in the electric storage element of the invention.

The specific organic additives include, for example, vinylene carbonate, vinyl ethylene carbonate, ethylene trithiocarbonate, ethylene sulfite, and fluoroethylene carbonate. Among them, vinylene carbonate can be preferably used. These organic additives are used alone or as a mixture of two or more thereof.

In the battery device of the present invention, the separator 3 is usually interposed between the positive electrode and the negative electrode in order to prevent the short circuit of the positive electrode and negative electrode. The material and shape of the separator 3 is not particularly limited. However, the separator 3 is preferably a material which readily passes the organic electrolytic solution therethrough, has insulating properties and is chemically stable. Examples thereof include microporous films, sheets, and nonwoven fabrics, which are made of various kinds of polymer materials. As specific examples of the polymer materials, there are used nylon, nitrocellulose, polyacrylonitrile, polyfluorovinylidene, polyethylene, and a polyolefin polymer such as polypropylene. In view of electrochemical stability and chemical stability, a polyolefin-based polymer is preferable.

The shape of the battery device of the present invention is not particularly limited. However, examples of the shapes include a cylindrical-shaped, square-shaped and laminate-shaped cells other than a coin-shaped cell shown in FIG. 1.

Next, a method for producing the battery device of the embodiment will be described.

The positive electrode 1 can be obtained by pressure-molding the positive electrode active material described above with a known conductive auxiliary agent and binder, or by applying paste prepared by mixing the positive electrode active material, and the known conductive auxiliary agent and binder with a solvent such as pyrrolidone to a collector such as an aluminum foil and drying the paste.

Examples of the conductive auxiliary agents include, but are not limited to, graphite, carbon black, needle coke, and the like. Alternatively, one kind thereof can be singly used, or a plurality thereof can be used in admixture.

The additive amount of the conductive auxiliary agent contained in the positive electrode active material layer is usually preferably 0.01 to 20% by weight, more preferably 0.1 to 15% by weight, and particularly preferably 1 to 10% by weight. When the additive amount of the conductive auxiliary agent is less than 0.01% by weight, the conductivity may become insufficient. On the other hand, the additive amount is over 20% by weight, the battery capacity may be reduced.

The kind of the binder is not particularly limited as long as the binder is a stable material in a nonaqueous solvent used for an electrolytic solution and a solvent used in producing an electrode. However, specific examples include polyethylene, polypropylene, polyethylene terephthalate, cellulose, styrene-butadiene rubber, isoprene rubber, butadiene rubber, fluororubber, acrylonitrile-butadiene rubber, a vinyl acetate copolymer, polyfluorovinylidene, polytetrafluoroethylene, fluorinated polyfluorovinylidene, polytetrafluoroethylene, an alkali metal ion conductive polymer, and the like. One kind of these substances can be used, or two or more kinds thereof can be used in combination.

The additive amount of the binder in the positive electrode active material layer is usually preferably 0.1 to 30% by weight, more preferably 1 to 20% by weight, and particularly preferably 5 to 10% by weight. When the additive amount of the binder is less than 0.1% by weight, the mechanical strength of the positive electrode may be insufficient to reduce the battery performance. On the other hand, the additive amount over 30% by weight may cause the shortage of the battery capacity and the increase of electrical resistance.

The solvent for forming the paste is not particularly limited as long as the positive electrode active material, the binder and the conductive auxiliary agent can be dissolved or dispersed in the solvent, which is easily removed by the subsequent drying. Examples thereof include water, alcohol, N-methylpyrrolidone, dimethylformamide, dimethylacetamide, methylethylketone, cyclohexanone, methyl acetate, tetrahydrofuran, toluene, acetone, dimethyl ether, dimethyl sulfoxide, benzene, xylene, hexane, and the like. One kind of these solvents may be used, or two or more kinds thereof can be used in admixture.

The electroconductive material in the negative electrode 2, similar to the positive electrode 1, includes graphite, carbon black, needle coke, etc., which are added preferably in an amount of 1% by weight to 15% by weight. The binder includes butadiene rubber, polyvinylidene fluoride, polytetrafluoroethylene, polymethacrylic acid, etc., which are added preferably in an amount of 15% by weight to 30% by weight.

The negative electrode active material may be added in an amount in accord with the ratio of the capacity of the negative electrode to the capacity of the positive electrode. In other words, when the capacity of the negative electrode is lower than the capacity of the positive electrode, overcharge of the negative electrode can be caused so that there is concern about solvent decomposition and lithium dendrite generation. When the capacity of the negative electrode is extremely higher than the capacity of the positive electrode, the capacity of the negative electrode cannot be sufficiently utilized, thus causing a reduction in energy density. Accordingly, the negative electrode capacity/positive electrode capacity ratio is preferably 1.1 to 1.5, and the amount of the negative electrode active material may be regulated according to the capacity ratio.

As the negative electrode 2, there can be used one prepared by forming the negative electrode active material described above in a thin film shape, or a powdered negative electrode active material. The negative electrode 2 can be obtained by pressure-molding the powdered negative electrode active material with a known conductive auxiliary agent and binder in the same manner as in the positive electrode 1 in the case of the powdered negative electrode active material, or by mixing the powdered negative electrode active material into an organic solvent such as pyrrolidone with a known conductive auxiliary agent and binder, coating the paste on a collector such as a foil and drying the paste.

Preferably, the negative electrode 2 is doped previously with lithium ions. The electrode potential of the negative electrode 2 working as the electric storage element can thereby be kept constant.

After the organic electrolytic solution is then impregnated in the positive electrode 1 and the separator 3 under reduced pressure, the positive electrode 1, the negative electrode 2, the separator 3 and the spacer 7 are placed in the order shown in FIG. 1 in the positive electrode can 4, and the positive electrode can 4 is filled with the proper quantity of the organic electrolytic solution. Furthermore, the positive electrode can 4 and the negative electrode can 5 are held in a state where the gasket 6 is interposed between the positive electrode can 4 and the negative electrode can 5 to obtain a battery device according to this embodiment.

EXAMPLES

In the following, the preferred examples of this invention are described in detail, in an illustrative manner. Here, the material, the blending quantity and the like described in these examples are not intended to limit the scope of the invention only to these, and are merely examples for description unless otherwise stated.

Example 1

Preparation of Positive Electrode

First, non-porous carbon was produced by a method described in DENKI KAGAKU, 66, 1311, 1998 or the like. The BET method confirmed that the specific surface area was 150 m$^2$/g. After 2.5 parts by weight of a polyfluorovinylidene powder (manufactured by Kureha Chemical Industry Co., Ltd., trade name: KF polymer #1100) as a binder and 5.5 parts by weight of Denka black (trade name, manufactured by DENKI KAGAKU KOGYO K.K.) as a conductive auxiliary agent were mixed with 100 parts by weight of the obtained non-porous carbon, N-methylpyrrolidone was added thereto, and they were kneaded to obtain electrode paste. This electrode paste was applied in a uniform thickness to one surface of an aluminum foil having a thickness of 20 μm as a positive electrode collector using an applicator for electrode coating (manufactured by TESTER SANGYO CO, LTD.). Then, the paste was vacuum-dried at a heating temperature of 130° C. for 2 hours to form a positive electrode active material layer. Thereafter, the total thickness of the active material layer was adjusted to be set to 79 μm by roll press to produce a sheet-shaped electrode. The obtained sheet-shaped electrode was formed into a circle shape to be used as a positive electrode for this test. The volume of the active material layer of the positive electrode formed based on the total thickness of the active material layer was 0.006 cc.

<Preparation of Negative Electrode>

70 parts by weight of lithium titanate (manufactured by Ishihara Sangyo Kabushiki Kaisha, Ltd.), 10 parts by weight of Denka Black as an electroconductive material, and 20 parts by weight of polyvinylidene fluoride as a binder were mixed with one another, and then N-methylpyrrolidone was added to and kneaded with the mixture, to produce an electrode paste. This electrode paste was applied via a Chibi coater (manufactured by Thank Metal Co., Ltd.) onto one side of a copper foil of 18 μm in thickness as a current collector, and then dried to give an electrode having an active material layer of 100 μm in thickness. The resulting sheet-shaped electrode was cut out in a circular shape. The volume of the active material layer in the cut electrode, as determined from the total thickness of the active layer, was 0.008 cc. Subsequently, the electrode was used as a negative electrode and a lithium foil as a positive electrode, and then charged up to 80% of the theoretical capacity at a charge rate of 1 C in a prepared electrolyte. At this time, the working potential of the negative electrode was about 1.5 V relative to the potential of the lithium metal as the positive electrode. The electrode which was pre-doped with lithium ions by the method described above was used as the negative electrode in this test.

<Preparation of Electrolyte>

$LiBF_4$ and a solvent of a mixture of ethylene carbonate (EC) and ethylmethyl carbonate (EMC) (volume ratio of 1:3, manufactured by Kishida Chemical Co., Ltd., lithium battery grade) were dissolved so that the electrolytic concentration was set to 0.75 mol/L in a dry box with an argon atmosphere having a dew point of −60° C. or less. The moisture of the solution after be mixed was measured by a Carl Fischer moisture meter (manufactured by Hiranuma Sangyo Co., Ltd., Hiranuma trace moisture measurement device AQ-7), and the moisture meter confirmed that the moisture was 30 ppm or less.

<Assembly of Electric Storage Element>

Figure 2:
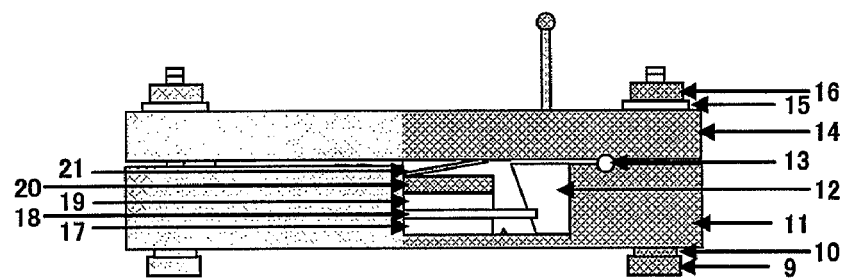
FIG. 2 is a schematic cross-sectional view of a battery device used in Examples of the present invention.

A battery device was produced using a test cell (manufactured by Japan Tomcell, Tomcell TJ-AC) having a structure shown in FIG. 2. In FIG. 2, a bolt 9, a caulking washer 10, a container body 11, a lid part 14, a nut 16, a round plate 20 and a spring 21 were made of stainless steel. There was used a separator 18 made of polypropylene and formed into a circle shape. The battery device was assembled in an argon dry box having a dew point of −60° C. or less. First, after the bolt 9, the caulking washer 10, the container body 11, the spacer 12, the O-ring 13, the lid part 14, a bush 15, the nut 16, the electrode 17, the round plate 20 and the spring 21 were vacuum-dried at a heating temperature of 120° C. for 24 hours, they were carried in the dry box. Further, after the separator 18 was vacuum-dried at a heating temperature of 60° C. for 24 hours, the separator 18 was carried in the dry box. After the electrode sheet formed into the circle shape was vacuum-dried at 130° C. for 12 hours, the electrode sheet was carried in the dry box.

Then, after the electrolytic solution was impregnated in the electrode and the separator 18 under reduced pressure, the electrode 17, the separator 18 and the spacer 12 were placed in the order shown in FIG. 1 in the container body 11, and the container body 11 was filled with the proper quantity of the organic electrolytic solution. Then, after setting the round plate 20 to which negative electrode 19 and the spring 21 was stuck in the order of FIG. 1, the lid part 14 was covered from upward, and the inside of the container body was sealed by the bolt 9 and the nut 16 to produce a battery device.

Comparative Example 1

After 2.5 parts by weight of a polyfluorovinylidene powder (manufactured by Kureha Chemical Industry Co., Ltd., trade name: KF polymer #1100) as a binder and 5.5 parts by weight of Denka black (trade name, manufactured by DENKI KAGAKU KOGYO K.K.) as a conductive auxiliary agent were mixed with 100 parts by weight of activated carbon confirmed that the specific surface area was 1700 $m^2$/g by the BET method, N-methylpyrrolidone was added thereto, and they were kneaded to obtain electrode paste. This paste was applied in a uniform thickness to one surface of an aluminum foil having a thickness of 38 μm as an electrode collector using an applicator for electrode coating (manufactured by TESTER SANGYO CO, LTD.). Then, the paste was vacuum-dried at a heating temperature of 130° C. for 2 hours, and the thickness of the electrode was adjusted to 82 μm by roll press to produce a sheet-shaped electrode. The same operation as in Example 1 was carried out except that the resulting sheet-shaped electrode was cut out in a circular shape and used as the positive electrode in this comparative example. The volume of the active material layer in the cut positive electrode, as determined from the total thickness of the active material layer, was 0.007 cc.

Example 2

In this example, the same operation as in Example 1 was carried out except that in the positive electrode active material layer, nonporous carbon having a surface specific area of 400 $m^2$/g and an interlayer distance $d_{002}$ of 0.367 nm between carbon microcrystals was used.

Example 3

In this example, the same operation as in Example 1 was carried out except that in the positive electrode active material layer, nonporous carbon having a surface specific area of 700 $m^2$/g and an interlayer distance $d_{002}$ of 0.369 nm between carbon microcrystals was used.

Example 4

In this example, the same operation as in Example 1 was carried out except that in the positive electrode active material layer, nonporous carbon having a surface specific area of 1000 $m^2$/g and an interlayer distance $d_{002}$ of 0.375 nm between carbon microcrystals was used.

Example 5

In this example, the same operation as in Example 1 was carried out except that in the positive electrode active material layer, nonporous carbon having a surface specific area of 10 $m^2$/g and an interlayer distance $d_{002}$ of 0.361 nm between carbon microcrystals was used.

Example 6

In this example, the same operation as in Example 1 was carried out except that in the electrolyte, propylene carbonate (PC) was used in place of the mixed solvent of ethylene carbonate (EC) and ethylmethyl carbonate (EMC).

Example 7

In this example, the same operation as in Example 1 was carried out except that in the electrolyte, trimethyl phosphate was used in place of the mixed solvent of ethylene carbonate (EC) and ethylmethyl carbonate (EMC).

Example 8

In this example, the same operation as in Example 1 was carried out except that in the electrolyte, trifluoromethyl phosphate was used in place of the mixed solvent of ethylene carbonate (EC) and ethylmethyl carbonate (EMC).

Example 9

In this example, the same operation as in Example 1 was carried out except that in the electrolyte, 0.75 mol/L $LiBF_4$ and 1.0 mol/L triethylmethylammonium tetrafluoroborate were dissolved in a mixed solvent of ethylene carbonate (EC) and ethylmethyl carbonate (EMC) (volume ratio EC:EMC=1:3).

Example 10

In this example, the same operation as in Example 1 was carried out except that in the electrolyte, 0.75 mol/L $LiBF_4$ and 1.0 mol/L N-ethyl-N-methylpyrrolidinium tetrafluoroborate were dissolved in a mixed solvent of ethylene carbonate (EC) and ethylmethyl carbonate (EMC) (volume ratio EC:EMC=1:3).

Example 11

In this example, the same operation as in Example 1 was carried out except that in the electrolyte, 0.75 mol/L $LiBF_4$ and 1.0 mol/L triethyl methyl phosphonium tetrafluoroborate were dissolved in a mixed solvent of ethylene carbonate (EC) and ethylmethyl carbonate (EMC) (volume ratio EC:EMC=1:3).

Example 12

In this example, the same operation as in Example 1 was carried out except that in the electrolyte, 0.75 mol/L $LiBF_4$ and 1.0 mol/L 1-ethyl-3-methylimidazolium tetrafluoroborate were dissolved in a mixed solvent of ethylene carbonate (EC) and ethylmethyl carbonate (EMC) (volume ratio EC:EMC=1:3).

Example 13

In this example, the same operation as in Example 1 was carried out except that in the electrolyte, 1-ethyl-3-methylimidazolium tetrafluoroborate were dissolved in a mixed solvent of ethylene carbonate (EC) and ethylmethyl carbonate (EMC).

Example 14

In this example, the same operation as in Example 1 was carried out except that in the electrolyte, $LiPF_6$ were dissolved in $LiBF_4$.

Example 15

In this example, the same operation as in Example 1 was carried out except that in the electrolyte, 0.5 mol/L $LiBF_4$ and 0.5 mol/L $LiPF_6$ were dissolved in a mixed solvent of ethylene carbonate (EC) and ethylmethyl carbonate (EMC) (volume ratio EC:EMC=1:3).

Comparative Example 2

This comparative example was carried out in the same manner as in Example 1 except for using non-porous carbon having a specific surface area of 10 $m^2/g$ and an interlayer distance $d_{002}$ of carbon microcrystals of 0.359 nm for the positive electrode active material layer.

Comparative Example 3

This comparative example was carried out in the same manner as in Example 1 except for using non-porous carbon having a specific surface area of 440 $m^2/g$ and an interlayer distance $d_{002}$ of carbon microcrystals of 0.355 nm for the positive electrode active material layer.

Comparative Example 4

This comparative example was carried out in the same manner as in Example 1 except for using non-porous carbon having a specific surface area of 730 $m^2/g$ and an interlayer distance $d_{002}$ of carbon microcrystals of 0.357 nm for the positive electrode active material layer.

Comparative Example 5

This comparative example was carried out in the same manner as in Example 1 except for using non-porous carbon having a specific surface area of 370 $m^2/g$ and an interlayer distance $d_{002}$ of carbon microcrystals of 0.393 nm for the positive electrode active material layer.

<Evaluation of Characteristic of Electric Storage Element>

The electric storage elements prepared in each of the examples and the comparative examples were examined in a charge/discharge test. The charge/discharge test was carried out in an atmosphere kept at 25° C. in a thermostatic apparatus (TEMPERATURE CARBINET LU-112 manufactured by Espec Corporation.). The test cell was kept in the thermostatic apparatus for 2 hours and then subjected to constant current charging with a current density of 1.0 $mAcm^{-2}$, and when the voltage reached 3.15 V, the constant current charging was shifted to constant voltage charging. The test cell was kept at 3.15 V for 10 minutes and then subjected to constant current discharging at 1.0 $mAcm^{-2}$, and when the voltage reached 0 V, the constant current discharging was shifted to constant voltage discharging, and the test cell was kept at 0 V for 10 minutes. This cycle was repeated 20 times, and from the integrated value of electric energy upon discharge in the $20^{th}$ cycle, the energy density per unit volume was calculated. The sum of the volumes of the positive electrode and negative electrode active material layers was regarded as the volume of the electric storage element.

The values in the examples and comparative examples are expressed in relative values assuming that the value in Example 1 is 100.

TABLE 1

|  | Discharge capacity per unit volume in $20^{th}$ cycle |
|---|---|
| Example 1 | 100 |
| Example 2 | 103 |

TABLE 1-continued

| | Discharge capacity per unit volume in 20$^{th}$ cycle |
|---|---|
| Example 3 | 103 |
| Example 4 | 106 |
| Example 5 | 91 |
| Example 6 | 97 |
| Example 7 | 91 |
| Example 8 | 91 |
| Example 9 | 103 |
| Example 10 | 103 |
| Example 11 | 100 |
| Example 12 | 103 |
| Example 13 | 78 |
| Example 14 | 94 |
| Example 15 | 91 |
| Comparative Example 1 | 72 |
| Comparative Example 2 | 13 |
| Comparative Example 3 | 22 |
| Comparative Example 4 | 25 |
| Comparative Example 5 | 38 |

As is evident from Table 1, the carbonaceous materials having a carbon-microcrystal interlayer distance $d_{002}$ of 0.36 nm to 0.38 nm and a specific surface area of 10 m$^2$/g to 1000 m$^2$/g showed a high discharge capacity.

The invention claimed is:

1. An electric storage element comprising at least a positive electrode having a positive electrode active material layer and a positive electrode current collector, a negative electrode having a negative electrode active material layer and a negative electrode current collector, a separator, and an organic electrolyte,
wherein the negative electrode active material layer comprises lithium titanate, and the positive electrode active material layer contains a carbonaceous material having a layered crystal structure, and
the interlayer distance $d_{002}$ of the layered crystal structure in the carbonaceous material is 0.36 nm to 0.38 nm, and the specific surface area of the carbonaceous material is 10 to 700 m$^2$/g.

2. The electric storage element according to claim 1, wherein the negative electrode has a working potential of 1 V to 2 V (vs. Li/Li+) or more.

3. The electric storage element according to claim 1, wherein the organic electrolyte comprises a lithium salt dissolved in an organic solvent.

4. The electric storage element according to claim 3, wherein the lithium salt is at least one of LiBF$_4$ and LiPF$_6$.

5. The electric storage element according to claim 1, wherein the organic electrolyte comprises a quaternary ammonium salt or a quaternary phosphonium salt and a lithium salt dissolved in an organic solvent.

6. The electric storage element according to claim 5, wherein the quaternary ammonium salt is an ionic liquid.

7. The electric storage element according to claim 5, wherein the lithium salt is at least one of LiBF$_4$ and LiPF$_6$.

8. The electric storage element according to claim 1, wherein the organic electrolyte comprises a lithium salt dissolved in an ionic liquid.

* * * * *